Figure 1:
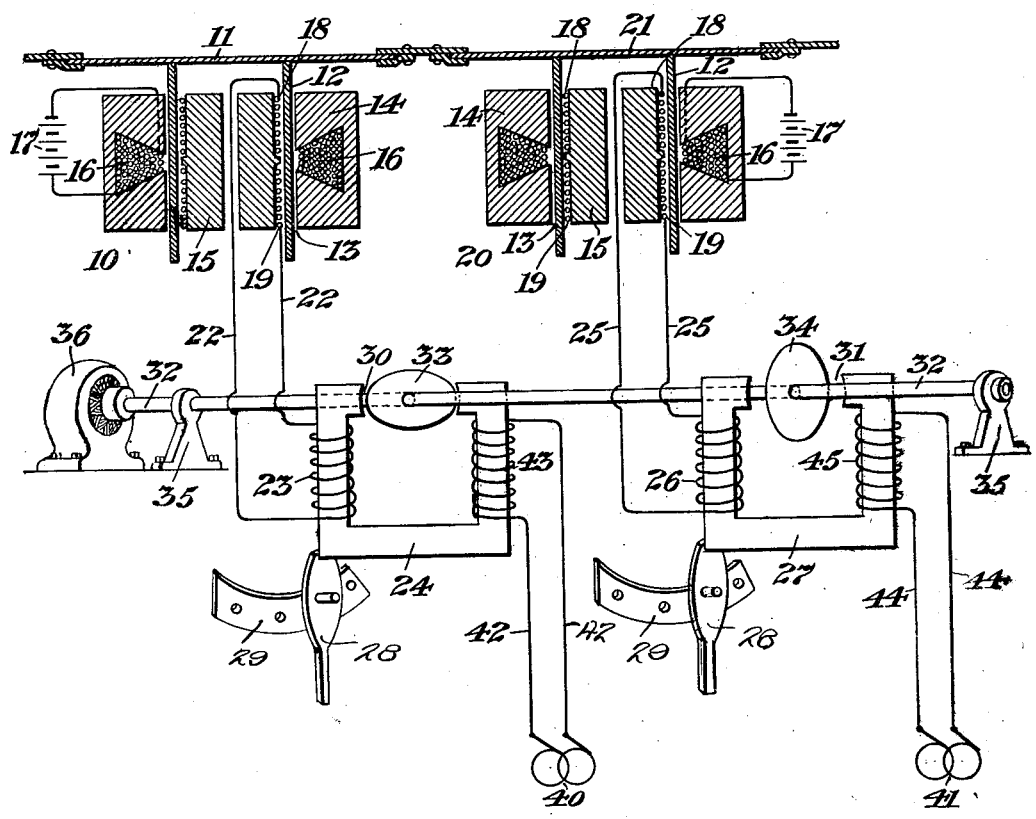

Nov. 6, 1928.

J. H. HAMMOND, JR 1,690,579

SYSTEM FOR THE PRODUCTION OF AND DETECTION OF COMPRESSIONAL WAVES

Filed Oct. 3, 1918    4 Sheets-Sheet 1

Nov. 6, 1928.　　　　　　　　　　　　　　　　　1,690,579
J. H. HAMMOND, JR
SYSTEM FOR THE PRODUCTION OF AND DETECTION OF COMPRESSIONAL WAVES
Filed Oct. 3, 1918　　　4 Sheets-Sheet 2
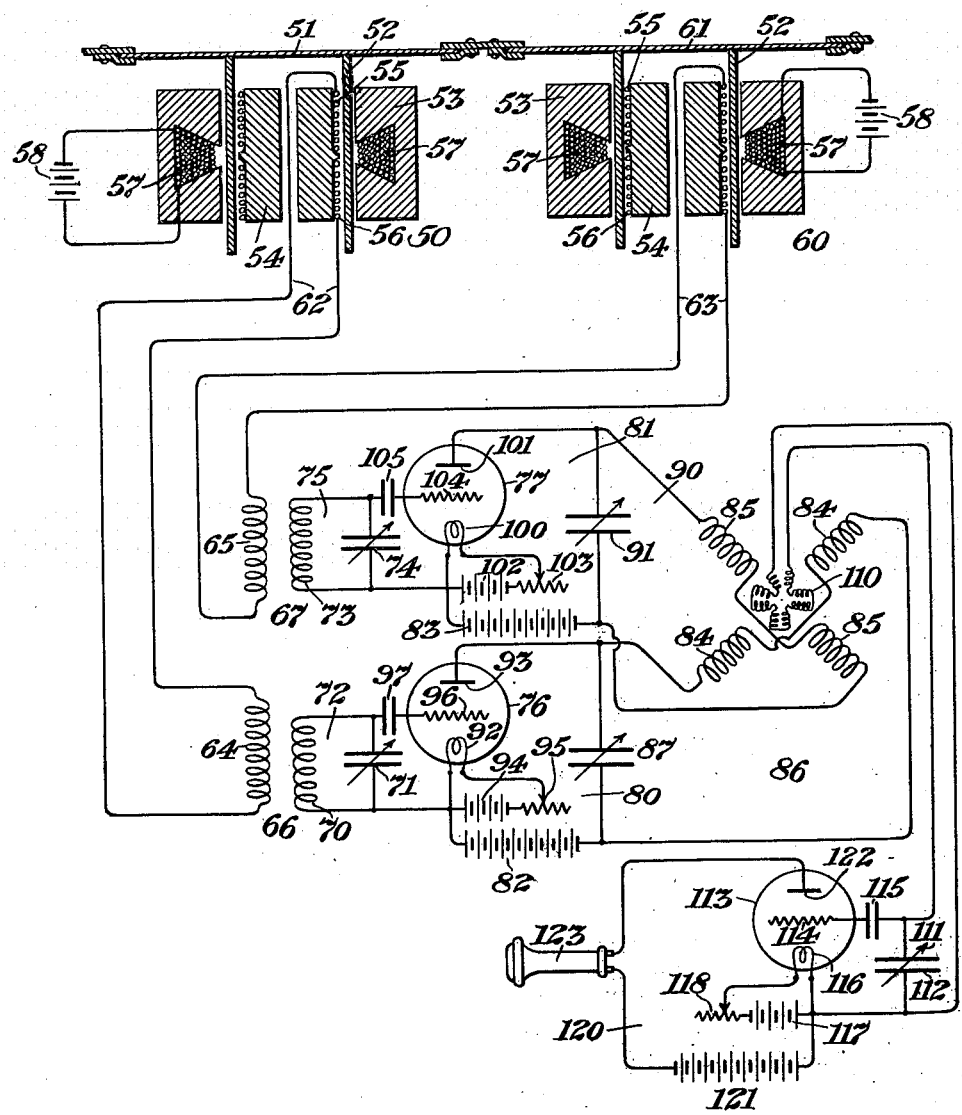

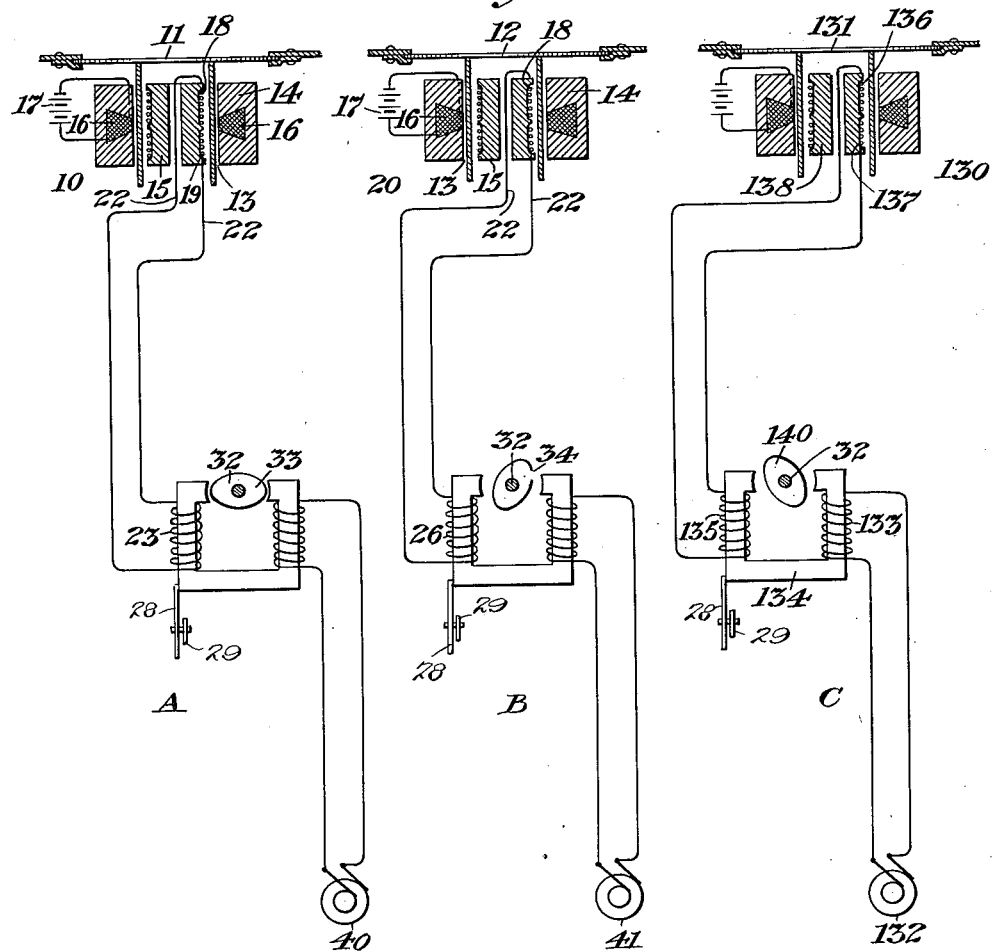

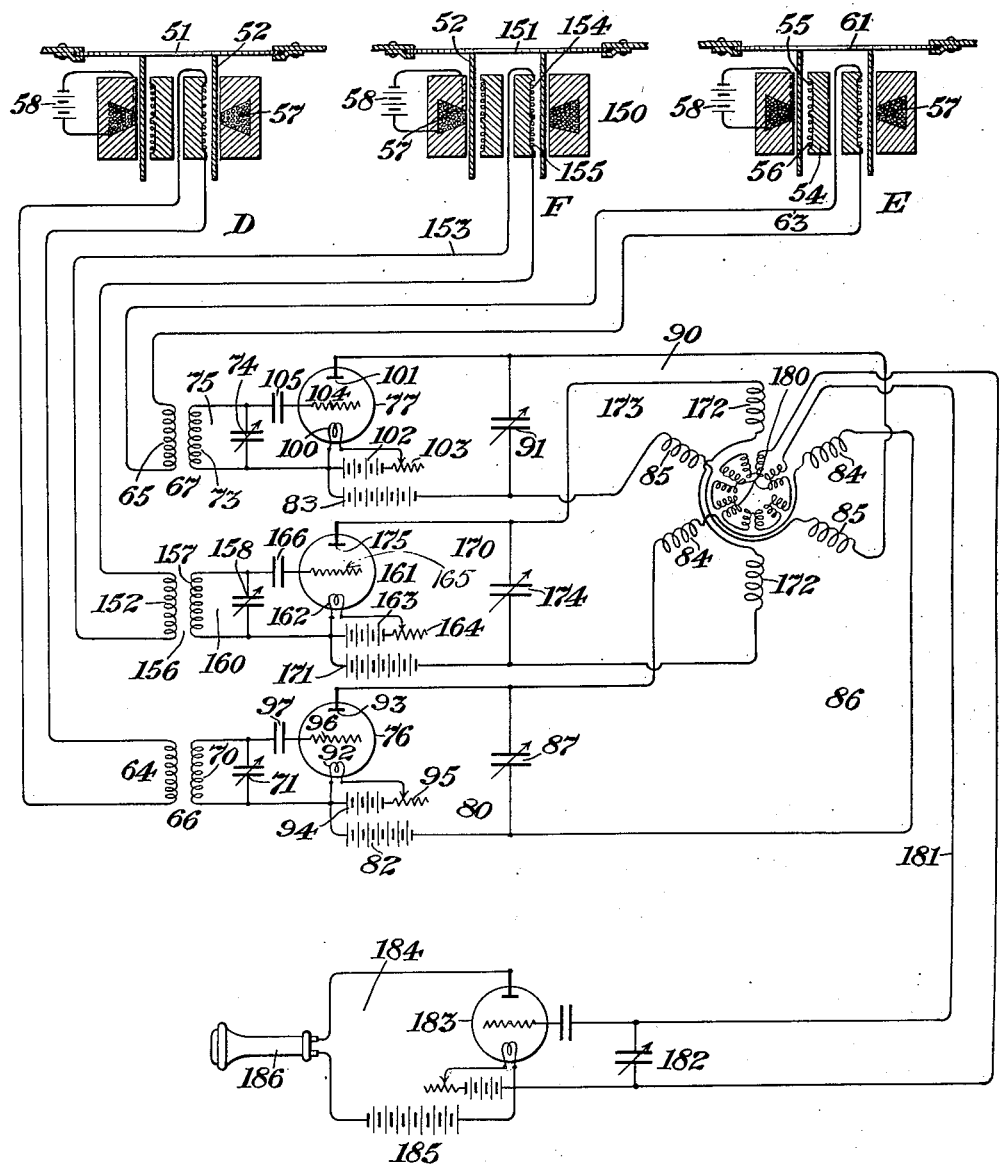

Patented Nov. 6, 1928.

1,690,579

UNITED STATES PATENT OFFICE.

JOHN HAYS HAMMOND, JR., OF GLOUCESTER, MASSACHUSETTS.

SYSTEM FOR THE PRODUCTION OF AND DETECTION OF COMPRESSIONAL WAVES.

Application filed October 3, 1918. Serial No. 256,687.

Some of the objects of the present invention are: to provide an improved group transmission system for compressional waves; to provide an improved system for the transmission of compressional waves whereby interference may be avoided; to provide a selective system for the transmission of compressional waves wherein a plurality of wave trains or series of waves are simultaneously emitted in such a manner that there will be a predetermined difference in phase relationship between different series or trains of waves, and wherein the plurality of series or trains of waves are selectively received by a receiving system in such a manner that a receiving device forming part of the receiving system, is caused to operate only as a result of the predetermined difference in phase of the received compressional waves; and to provide other improvements as will hereinafter appear.

In the accompanying drawings Figure 1 represents diagrammatically a sending station for the production of compressional waves, embodying one form of the present invention; Figure 2 represents digrammatically one form of receiving station for compressional waves embodying the present invention; Figure 3 represents diagrammatically another form of sending station for compressional waves embodying the present invention; and Figure 4 represents diagrammatically one form of receiving station for compressional waves sent from the station shown in Figure 3.

Referring to the drawings and particularly to Figure 1, one form of sending station for the production of compressional waves constructed in accordance with this invention, comprises two electro-dynamical oscillators 10 and 20 of any well known form and arranged to emit respectively two series of different high pitched sound wave trains having frequencies, for example, of 1,000 to 1,500 cycles respectively. These oscillators 10 and 20 comprise respectively two driven diaphragms 11 and 21, which are rigidly secured respectively to copper cylinders 12 which form the oscillating members of each unit. Since the two oscillators are of like construction the description will be limited to one, and the same reference numerals will be applied to like parts in each. The copper cylinder 12, which forms the armature of the oscillator, is located in an air gap 13 formed between an annular electromagnet 14 and a core 15, the arrangement being such that the cylinder 12 encircles the core 15 and in turn is encircled by the electromagnet 14, though spaced from both to permit free movement. The electromagnet 14 may be of cast iron, soft steel, or any other suitable material, and is provided with an internal annular recess in which is wound a coil 16 of insulated wire, the ends of which are respectively connected to opposite sides of a battery 17, which normally maintains the electromagnet energized. The core 15 is encircled by two windings 18 and 19, wound in opposite directions thereon and located in the air gap, but spaced from the cylinder 12.

In order to produce a current in the respective oscillators 10 and 20, the pairs of windings 18 and 19 in one oscillator 10 are in series, by way of conductors 22 with a secondary coil 23 of a transformer 24, while the pairs of windings 18 and 19 of the other oscillator 20 are in series, by way of conductors 25 with a secondary coil 26 of a tranformer 27. The transformers 24 and 27 are of yoke form, providing air gaps 30 and 31 respectively in the magnetic circuit and in the present form both transformers are mounted in any well known manner to be adjustably rotated about and relative to a shaft 32 as an axis.

For the purpose of varying the respective air gaps of the transformers, the shaft 32 is provided with a pair of magnetic reluctance varying elements 33 and 34, each rigidly fixed to the shaft 32 for rotation therewith and respectively located between the jaws of the two transformers 24 and 27. These magnetic reluctance varying elements 33 and 34 are of iron or other suitable material adapted to permit the magnetic flux to traverse, and are of irregular contour to vary the air gap in the desired manner. The shaft 32 is suitably mounted in bearings 35 and is arranged to be driven at a constant speed by a motor 36 or any suitable driving means, and thus rotate the magnetic reluctance varying elements 33 and 34 at a constant rate of speed, say thirty times per second. Furthermore, the two magnetic reluctance varying elements are mounted on the shaft 32 so that their respective long axes are perpendicular to each other, with the result that under rotation first one magnetic reluctance varying element and then the other will substantially bridge the air gap of the respective transformers 24 and 27.

For supplying high frequency currents to the respective transformers 24 and 27, the alternators 40 and 41 are employed, the former being connected by conductors 42, with a primary coil 43 of the transformer 24 and the latter by conductors 44 with a primary coil 45 of the transformer 27. The two alternators 40 and 41 have different high frequencies of, say 1,000 cycles and 1,500 cycles respectively, so that in operation the high frequency currents pass through the two transformers 24 and 27 and cause the diaphragms 11 and 21 to vibrate at a rate of 1,000 and 1,500 cycles respectively. With these two high frequency currents flowing through the respective transformers to cause vibration of the diaphragms 11 and 21 at the aforesaid rate of 1,000 cycles and 1,500 cycles, the effect of rotating the magnetic relutance varying elements 33 and 34 is to cause periodic amplitude variations of the currents in the respective secondary coils 23 and 26, which results in similar periodic amplitude variations of the to and fro motions of the diaphragms 11 and 21. Hence the direct result of arranging the reluctance varying elements 33 and 34 with their long axes 90° apart and rotating them at a constant speed of say thirty revolutions per second, is to cause 60 cycle periodic amplitude variations of the diaphragm 11 and 60 cycle periodic amplitude variations of the diaphragm 21, the latter being 90° out of phase with the former. This phase difference may be varied at will by rotating either of the transformers 24 and 27 bodily about the shaft 32 as an axis to any desired new position and consequently signals may be sent at other differences of phase as predetermined.

Referring to Figure 2 of the drawings, one form of station for receiving compressional waves having different high frequences comprises two electro-dynamical oscillators 50 and 60, here shown as similar to those at the sending station and consisting respectively of two diaphragms 51 and 61 suitably mounted for vibratory action in a fixed part and each having a copper cylinder 52 as the oscillatory member. In order to identify the parts and avoid confusion in reading the drawings, like parts of these oscillators will be indicated with reference numerals different from those in Figure 1, but otherwise the description heretofore given may apply to those devices. Thus in each oscillator the cylinder 52 is free to move relative to an encircling magnet 53 in the air gap between that magnet 53 and a core 54, this latter having a pair of coils 55 and 56 wound thereon in opposite directions. The magnet 53 is internally recessed to receive a winding 57 in series with and energized by a battery 58, the arrangement being such that vibrations of the respective diaphragms 51 and 61 through the electro-dynamical oscillators causes alternating currents to be induced in the coils 55 and 56 of the respective circuits 62 and 63 and which flow through the primary coils 64 and 65 which are included in the circuits 62 and 63 respectively.

For the purpose of transforming these two alternating currents, which, as will later appear have different frequencies and periodic amplitude variations differing in phase, the coils 64 and 65 form primary coils respectively of transformers 66 and 67, the former having a secondary coil 70 forming with a condenser 71 a closed oscillatory circuit 72 and the latter having a secondary coil 73 forming with a condenser 74 a closed oscillatory circuit 75. The closed oscillatory circuit 72 is tuned to the same frequency as one of the oscillators at the sending station, in this case, 1,000 cycles per second, while the other closed oscillatory circuit 75 is tuned to the frequency of the other oscillator as the sending station, here 1,500 cycles per second. Also the diaphragm 51 controlling the induced current to the transformer 66 is mechanically tuned to respond to impressed waves of the 1,000 cycle frequency, while the diaphragm 61 controlling the induced current to the transformer 67 is mechanically tuned to respond to impressed waves of the 1,500 cycle frequency. The circuits 72 and 75 are arranged to respectively control two detectors 76 and 77 of any suitable type, for instance, as in the form shown, two gaseous detectors of well-known construction, which are arranged to control two circuits 80 and 81 including respectively two sources of high potential direct current, as, for instance, two high potential batteries 82 and 83, and two primary coils 84 and 85 those latter being arranged so that their longitudinal axes lie in the same plane and intersect at right angles. Each of these primary coils 84 and 85 is arranged in two aligned spaced but connected sections, the one 84 being in a closed oscillatory circuit 86 including a variable condenser 87 shunted around the coil 84, and the other 85 being in a closed oscillatory circuit 90 including a variable condenser 91 shunted around the coil 85. These two closed circuits 86 and 90 are tuned to the frequency of the amplitude variations of the transmission system, which has here been taken by way of illustration as 60 cycles per second. The high potential battery 82 is arranged to discharge through the primary coil 84 and the ionized space between the heated filament 92 and the plate electrode 93. This filament 92 is arranged to be heated by means of a battery 94 and controlled by a rheostat 95. The grid electrode 96 of the detector 76 leads through a stoppage condenser 97 to one side of the condenser 71, while the other side of this condenser 71 leads to the heated filament 92. The high potential battery 83 is arranged to discharge through the primary coil 85 and the ionized space between the heated filament 100 and the plate electrode 101. The filament 100 is arranged to be heated by means of a battery 102, and controlled by a rheostat 103. The grid electrode 104 of the detector 77 leads through a stoppage condenser 105 to one side of the condenser 74, while the other side of this condenser 74 leads to the heated filament 100.

Within the fields of the primary coils 84 and 85 there is a secondary coil 110, consisting of, say, eight sections connected in series and arranged to radiate substantially from the point of intersection of the axes of the two primary coils 84 and 85. The sections of this coil 110 are spaced equi-angularly around their centre of radiation, so that the longitudinal axes of the two primary coils 84 and 85 will respectively bisect the angles formed between corresponding opposed pairs of the secondary coil sections. The sectional secondary coil 110 is in a closed oscillatory circuit 111, which includes a variable condenser 112 and which is tuned to the secondary frequency of the system, here 60 cycles, multiplied by the number of coil sections, here 8, so that the circuit is tuned to eight times sixty, or four hundred and eighty (480) cycles per second. This closed circuit 111 is arranged to control a gaseous detector 113, or any other suitable detector, the grid electrode 114, of which leads through a stoppage condenser 115 to one side of the variable condenser 112, the other side of which leads to the heated filament 116. A battery 117 and a rheostat 118 serve to maintain the filament 116 properly heated. The gaseous detector 113 is arranged to control a circuit 120 including a high potential battery 121, or other source of current, a plate electrode 122 and a telephone receiver 123, or any other well known or suitable instrument.

In the operation of the receiving system shown in Figure 2, the two series of compressional waves, the one of 1 000 cycle frequency and the other of 1,500 cycle frequency, transmitted from the sending station, strike the two diaphragms 51 and 61, and as these are tuned respectively to the 1,000 cycle and 1,500 cycle frequencies, both will respond and cause alternating currents having a frequency of 1,000 cycles per second to flow in the primary coil 64, and alternating currents having a frequency of 1,500 cycles per second to flow in the primary coil 65. These alternating currents will each possess a periodic amplitude variation, the same as impressed at the sending station, here sixty times per second, and these periodic amplitude variations will possess the same 90° phase difference which they had on leaving the transmitting station. The action of the transformers 66 and 67 is to cause the two detectors 76 and 77 to operate to emit unidirectional current impulses through the two control circuits 86 and 90, such impulses having respectively high frequencies of 1,000 cycles and 1,500 cycles per second. In addition both of these controlled circuits 86 and 90 have a secondary frequency of 60 cycles per second. Since in the present instance there is a phase difference of substantially 90° in the periodic modifications of the two series of received waves, two series of electrical oscillations having the same frequency and intensity, but having a difference of phase of substantially 90° will be set up in the two coils 84 and 85. The resultant magnetic field will be constant in strength but will rotate uniformly, making one complete revolution per cycle of the alternating current, that is, 60 per second in the present example. This rotating magnetic field will induce in the closed oscillatory circuit 111, containing the secondary coils 110, electrical oscillations having a frequency equal to the secondary frequency of the system, multiplied by the number of sections of the secondary coil, namely, a frequency under the conditions heretofore stated of 480 cycles per second. This oscillation of the closed circuit 111 will cause the operation of the control detector 113, which will cause undirectional impulses having a frequency of 480 per second to operate the receiving device, or as in the present construction, will be audible in the telephone receiver 123.

In case alternating currents of the same frequency and intensity but 0° or 180° out of phase traverse the coils 84 and 85 their resultant magnetic field will not rotate but will remain constant in direction and undergo periodic amplitude variations. Such a non-rotating magnetic field would impress upon the closed circuit 111 containing the secondary coil 110 electro-motive impulses, having the same frequency as the system and not eight times the secondary frequency, as in the case of a rotating magnetic field, and consequently in the case of the non-rotating magnetic field very weak, if any, oscillations will be set up in the closed circuit 111, which is tuned to eight times the secondary frequency, and consequently the detector 113 and the controlled receiving instrument 123 will be practically unaffected. Furthermore, the effects of static and other forms of radiant energy not intended to operate the receiving system of the present invention produce no rotating magnetic field and consequently no oscillation will be set up in the closed circuit 111, and accordingly the indicating device 123 will not be affected thereby. Similarly so-called man-made interference such as radiations emanating from motor commutators or high power transmission lines, produce substantially no effect on the receiving device of the present invention.

Referring to Figure 3 of the drawing, a modified form of transmitting station for the production of compressional waves is shown wherein three high-pitched wave trains are employed by adding another wave producing unit to the apparatus shown in Figure 1. In order to avoid repetition two of the units A and B and their respective like parts are identified by the same reference numerals as heretofore employed. The additional unit C added consists of an electro-dynamical oscillator 130 of the same construction as the other oscillators employed respectively with the two other units A and B, but having a diaphragm 131 tuned to vibrate at a different frequency, say 1,250 cycles from the others. For the sake of uniformity of descriptions, the two diaphragms 11 and 21 are assumed to be tuned, as before, to 1,000 cycles and 1,500 cycles per second. A high frequency alternator 132 for the unit C supplies current, having a frequency of 1,250 cycles to a primary coil 133 of a transformer 134, the secondary 135, of which leads to the pair of windings 136 and 137 of the core 138 of the electro-dynamical oscillator 130. This transformer 134 is similar to those already described in detail and has an element 140 located in the air gap between the ends of the transformer yoke. The magnetic reluctance varying element 140 is fixed to the shaft 32 and operates to vary the magnetic circuit through the gap.

In the present form the three reluctance varying elements 33, 34 and 140 are set angularly about the shaft 32 at 120° intervals so that the 60 cycle periodic amplitude variations will differ in phase by 120°, this being the predetermined phase in this instance for the transmission of a signal. This phase difference can be destroyed in this case by bodily rotating two of the transformers about the shaft though a suitable angle.

In the operation of this form of sending station the shaft 32 is rotated at a constant rate of speed, say thirty times per second and the three elements 33, 34 and 140 are thus rotated to cause periodic amplitude variations of the currents in the secondaries 23, 26 and 135, and hence periodic amplitude variations of the diaphragms 11, 12 and 131. In the present example, the 60 cycle periodic amplitude variations of the diaphragm 11 will be 120° out of phase with the 60 cycle periodic amplitude variations of the diaphragm 12, while the 60 cycle periodic amplitude variations of the diaphragm 12 will be 120° out of phase with the 60 cycle periodic amplitude variations of the diaphragm 131.

Referring to Figure 4 of the drawings, a modified form of receiving station is shown, arranged to receive three high pitched wave trains, having periodic amplitude variations respectively, differing in phase by 120°, such as produced by the station shown in Figure 3. In this form two of the receiving units D and E are identical with the units heretofore described in Figure 2 and like parts, accordingly have the same reference numerals applied thereto.

The third unit F, which is responsive to high-pitched wave trains from unit C of Figure 3, namely wave trains having a frequency of 1,250 cycles, consists of an electro-dynamical oscillator 150, having a diaphragm 151 tuned to vibrate at a frequency of 1,250 cycles, the said oscillator being arranged to induce alternating currents in a coil 152 of the frequency of the impressed waves. This coil 152 is included in a circuit 153 with the windings 154 and 155 of the oscillator 150, and forms the primary of a transformer 156, of which a coil 157 forms the secondary. The secondary coil 157 forms with the condenser 158 a closed oscillatory circuit 160, which is tuned to the same frequency as the oscillator 150, here 1,250 cycles. As in the units D and E this circuit 160 is arranged to control a suitable detector, such as a gaseous detector 161, having a filament 162 heated and controlled by a battery 163 and rheostat 164, and in which a grid 165 connects through a stoppage condenser 166 with one side of the condenser 158, the other side of which is connected with the heated filament 162. The detector 161 is arranged to control a circuit 170 including a source of high potential direct current, such as a battery 171, and a primary coil 172, which latter is in a closed oscillatory circuit 173, including a variable condenser 174, shunted around the said coil 172. This closed oscillatory circuit 173 is tuned to the frequency of the amplitude variations of the transmission system, here 60 cycles per second. The high potential battery 171 is arranged to discharge through the primary coil 172, and the ionized space between the heated filament 162 and the plate electrode 175.

The arrangement of the three primary coils 84, 85 and 172 is such that their longitudinal axes lie in the same plane and intersect at a common point and are equi-angularly spaced. Each primary coil is divided into two spaced aligned sections and collectively the said coils surround a secondary coil 180, consisting of say 12 sections in series and arranged in pairs radiating equi-angularly from the point of intersection of the longitudinal axes of the primary coils, while the longitudinal axes of each pair of opposed coils coincides with a line which bisects the angle formed between the longitudinal axes of two corresponding primary coils.

The secondary coil 180 is in a closed oscillatory circuit 181, which includes a variable condenser 182 and which is tuned to twelve times the secondary frequency of the system or in the present instance 720 cycles per second. The closed circuit 181 is arranged to control an auxiliary gaseous detector 183 of well known construction, which, in turn, is arranged to control a circuit 184 including a high potential battery 185 and a suitable receiving instrument, such as a telephone receiver 186.

In the operation of the receiving system shown in Figure 4, the three series of complex compressional waves, one of 1,000 cycle frequency, another of 1,250 cycle frequency and a third of 1,500 cycle frequency sent from the transmitting station, strike the three diaphragms, 51, 151 and 61, and as these are tuned respectively to the aforesaid frequencies they will simultaneously respond and cause alternating currents to flow into the respective primary coils 64, 65 and 152, having frequencies of 1,000 cycles, 1,250 cycles and 1,500 cycles. These alternating currents will also each possess a periodic amplitude variation the same as impressed at the sending station, namely, in the present instance sixty times per second, and these periodic amplitude variations will possess the same 120° phase difference which they had on leaving the transmitting station. The action of the three detectors 76, 77 and 161 is to respectively cause unidirectional current impulses in the three control circuits 86, 90 and 173, having respectively high frequencies of 1,000, 1,250 and 1,500 cycles per second, and a secondary frequency of 60 cycles per second.

As there is a phase difference of 120° in the periodic modifications of the three series of received waves, there will be three series of electrical oscillations, having the same frequency and intensity but differing in phase 120°, set up in the three coils 84, 85 and 172. The resultant magnetic field will be constant in strength and rotate uniformly making one revolution per cycle of the alternating current, namely sixty per second. This magnetic field will induce in the closed oscillatory circuit 181 containing the secondary coils 180, electrical oscillations having a frequency equal to the secondary frequency of the system, multiplied by the number of sections in the secondary coil 180 or twelve times sixty in the present case or 720 cycles per second. The oscillations in the closed circuit 181 operate through the detector 183, to cause unidirectional impulses in the circuit 184, having a frequency of 720 cycles per second, which are audible in the receiving instrument 186. Should alternating currents of the same frequency and intensity, but 0° or 180° out of phase traverse the coils 84, 85 and 180 their resultant magnetic field will not rotate but will remain constant in direction and undergo periodic amplitude variations. The result of such a field is to impress impulses, upon the closed circuit 181, having the same frequency as the system and not twelve times the secondary frequency and as this circuit is tuned to twelve times the secondary frequency the receiving instrument 186 will be practically unaffected.

Having thus described this invention, I claim:

1. The method of producing signal waves which consists in generating a plurality of alternating magnetic fields of force, varying the reluctance of the paths of the magnetic fields periodically to maintain a predetermined phase relationship among the amplitude variations of said plurality of magnetic fields, producing from said magnetic fields a plurality of series of electrical oscillations respectively by induction, and utilizing said electrical oscillations to produce a plurality of series of sound waves respectively.

2. The method of signalling, which consists in the step of generating a plurality of series of electrical oscillations having different high frequencies respectively, producing therefrom, inductively, a plurality of alternating magnetic fields of force respectively, varying the reluctances of the paths of the magnetic fields periodically so as to vary the strength of the magnetic fields to maintain a predetermined phase relationship among the amplitude variations of said magnetic fields, and producing therefrom, inductively, a plurality of electrical currents respectively having impressed thereon a corresponding plurality of series of periodic amplitude variations.

3. The method if signalling which consists in the step of generating a plurality of electrical oscillations having different high frequencies respectively, producing therefrom, inductively, a plurality of alternating magnetic fields of force respectively, varying the reluctances of the paths of the magnetic fields periodically so as to vary the strength of the magnetic fields to maintain a predetermined phase relationship among the amplitude variations of said magnetic fields, producing from said magnetic fields, inductively, a plurality of electrical currents having impressed thereon a corresponding plurality of series of periodic amplitude variations respectively, and utilizing said currents to produce a plurality of series of sound waves respectively.

4. The method of signalling, which consists in the step of generating a plurality of electrical oscillations having different high frequencies respectively, producing therefrom, inductively, a plurality of alternating magnetic fields of force respectively, varying the reluctances of the paths of the magnetic fields periodically so as to vary the strength of the magnetic fields to maintain a predetermined phase relationship among the amplitude variations of said magnetic fields, producing thereby, inductively, a plurality of electrical currents respectively having impressed thereon a corresponding plurality of series of periodic amplitude variations, and transforming the energy of said last named currents to produce a plurality of series of sound waves respectively.

5. The method of producing signal waves which consists in generating a plurality of sustained alternating fields of force of relatively high frequencies respectively, varying the reluctances of the paths of the magnetic fields periodically at a relatively low frequency in such manner as to produce amplitude variations having a predetermined phase relationship therebetween, generating from said plurality of amplitude varied alternating magnetic fields of force a corresponding plurality of amplitude varied electrical oscillations having predetermined phase relations between the amplitude variations, and utilizing said electrical oscillations to produce sound waves.

Signed at Gloucester in the county of Essex and State of Massachusetts, this 23d day of September, A. D. 1918.

JOHN HAYS HAMMOND, Jr.